UNITED STATES PATENT OFFICE.

JONAS W. AYLSWORTH, OF EAST ORANGE, NEW JERSEY, ASSIGNOR TO CONDENSITE COMPANY OF AMERICA, OF GLEN RIDGE, NEW JERSEY, A CORPORATION OF NEW JERSEY.

PROCESS FOR COATING POROUS SUBSTANCES.

1,139,470.   Specification of Letters Patent.   Patented May 18, 1915.

No Drawing.   Application filed April 10, 1912. Serial No. 689,841.

*To all whom it may concern:*

Be it known that I, JONAS W. AYLSWORTH, a citizen of the United States, and a resident of East Orange, in the county of Essex and State of New Jersey, have invented certain new and useful Improvements in Processes for Coating Porous Substances, of which the following is a description.

My invention relates to processes for coating wood and other porous cellular or fibrous substances with a varnish or enamel composition, and my object is to produce an improved process of this nature in such manner that an improved coated article will be uniformly produced thereby.

My process more especially relates to the formation upon wood of a coating or veneer formed of a hard infusible phenolic condensation product.

Ordinarily in processes of this character, the wood is dipped into hot varnish, that is, the wood is not heated before being dipped, or the wood is not heated to a temperature higher than that of the varnish. The coated article is then baked and the air in the pores of the wood is expanded by the heat of the varnish and the subsequent heat of the baking, so that it forces its way out through the coating to form blisters and mar the surface of the coating. If a counteracting pressure is used during the baking operation, an autoclave must be used, and furthermore, since the vapor contents of the wood and the varnish are thereby kept under tension, the coating is likely to crack or develop flaws subsequently. By my process, which I will now describe, these difficulties are obviated.

In its broadest aspects, the process consists of the following steps: First, the substance to be coated is heated at a sufficient temperature and for a sufficient length of time to thoroughly dry the same and to expand the air and gases in the pores or interstices of the substance. Next, the object, before it has had a chance to cool, is dipped in or coated with a cold solution or fluid form of the varnish or coating composition to be applied, or with a solution or composition which is heated somewhat, but which is of a temperature less than that of the substance treated. The coated object is then dried or baked at a temperature lower than that at which the uncoated substance was initially heated. By this process, the pores or interstices of the substance are sealed and filled up with the varnish composition so that the substance cannot subsequently take up moisture before subsequent coats are applied and the air or vapors within the pores are not expanded during the application of the varnish and the baking thereof, to cause defects in the coating.

As applied to wood structure, and the phenolic condensation product varnish or enamel which I prefer to use, the process is specifically as follows: The wood is first dried for several hours at 220° F. or higher, preferably about 250° F., but not at a temperature high enough to injure the wood. Hard wood can be dried at the higher temperature without injury but resinous woods require a longer application at a lower temperature until the resinous matters are well dried out. Secondly, the wood, while hot, is dipped in the enamel composition. The coated object is then removed at once from the enamel composition and is baked in an ordinary oven at any temperature lower than that at which the wood was dried. The time of baking will depend upon the temperature used or the nature of the enamel and may vary from one to six hours. The coating will harden by chemical reaction to form an infusible, hard, coating. The object can be rubbed and finished after one coat, or subsequent coats may be applied, rubbing down between each application and baking of the composition, if a high finish is desired. As stated, the application of the first coating in the manner described, seals and fills up all of the pores of the wood so that the latter cannot take up moisture before subsequent coats are applied.

The lacquer, varnish or enamel composition used, which I will refer to generically as a varnish composition, preferably comprises a phenol or cresol resin, such as that described in my Patent No. 1,020,593, granted February 19, 1912, but containing from 20 to 100 parts of free cresol or phenol and a sufficient amount of liquid mono-chloro-naphthalene to render the mass fluid at a relatively low temperature, as room heat, or at a slightly elevated temperature, up to say 150° F. The added cresol or phenol plus the mono-chloro-naphthalene together should amount to about twice the weight of the cresol or phenol resin used. The cresol or phenol resin referred to is a fusible phenol formaldehyde condensation product in which the formaldehyde is all combined with the phenol and which is preferably dehydrated at a temperature of approximately 400° F. if under normal pressure. In referring to the proportion of free phenol or cresol and mono-chloro-naphthalene to the phenol resin, I refer, for the purpose of the proportion, to a resin containing no uncombined phenol. Hexa-methylene-tetra-amin or tri-oxy-methylene or other solid anhydrous polymer of formaldehyde is also incorporated in the composition in a sufficient amount to harden the mass during the baking operation to a hard, infusible product. The amount of hardening agent is calculated by supplying the same in the proportion of three or four per cent. of the weight of the anhydrous phenol or cresol resin and an additional amount in a proportion of 20 to 25 per cent. of the weight of the free phenol or cresol. Various solid solvents or plasticity ingredients may also be incorporated in the mass when desired, for special purposes, as for example, phthalic or benzoic anhydrid, when a polymer of formaldehyde is the hardening agent used, tetra-chlorophenol, when hexa-methylene-tetra-amin is the hardening agent used, etc.

In the above composition the liquid mono-chloro-naphthalene may be replaced by acetylene-tetra-chlorid, in the same proportions as given for the mono-chloro-naphthalene.

Solid chloro-naphthalenes are also desirable ingredients of the composition described, particularly when the same is made from cresol resin, in addition to the liquid mono-chloro-naphthalene or acetylene tetrachlorid, since the solid chloro-naphthalenes reduce the coefficient of expansion of the varnish film after hardening. This coefficient is greater in the case of a composition made from cresol resin than one made from phenol resin, more particularly referred to in my Patent No. 1,020,593, above mentioned. In the hardened varnish film made from cresol resin and a hardening agent there is generally a tendency to "check" or form minute cracks, upon hardening, if the solid chloro-naphthalenes are not added to the ingredients. The solid chloro-naphthalenes counteract this tendency particularly the higher derivatives, as tetra-and hexa-chloro-naphthalenes. These substances may be used in varying percentages, and remain as valuable plasticity or solid solvent ingredients in the film.

With compositions such as those above described, the hardening reaction between the ingredients may readily be caused to ensue at a temperature of for example 205° to 215° F. It should be noted that these compositions contain no water or volatile solvents, such as are contained in the ordinary varnish.

It should be particularly noted in the process described that the coated article may be baked during the hardening of the varnish film in an ordinary oven, without the use of counteracting pressure. In prior processes in which the baking operation is conducted at a temperature higher than that at which the wood was dried, moisture contained in the structure of the wood, and not liberated at the temperature at which the wood was dried, is evolved, and escaping through the varnish coating, causes flaws therein. This is necessarily so whenever the baking is at a higher temperature than the drying, unless a counteracting pressure is used during the baking, in which case, as stated, the vapor contents of the wood and varnish, being kept under tension by the pressure, tend to force their way out subsequently and cause cracks.

While I consider the composition just described as best adapted for the purposes of my improved process, it is to be understood that my invention is not limited thereto, but may be practised with other varnish compositions in the nature of phenolic condensation products or otherwise.

Having now described my invention what I claim as new and desire to protect by Letters Patent is:

1. A process for coating wood consisting in drying the wood at a temperature and for a time sufficient to dry the same, without injury thereto, coating the same while hot with a phenolic varnish solution which is maintained at a temperature lower than that of the wood, and which requires heating to harden the same fully, by chemical reaction and then baking the coated article at a temperature lower than that at which the wood was dried, substantially as described.

2. A process for coating wood with a phenolic condensation product, consisting in drying the wood at a temperature higher than the reaction temperature of the said product, then coating the wood while hot with a fluid composition containing ingredients adapted upon heat treatment to react to form an infusible phenolic condensation product, which composition is maintained at a temperature less than that of the wood, and then heating the coated article at a pressure no greater than atmospheric and at a temperature less than that at which the wood was dried, but at a sufficient temperature and for a sufficient time to cause the desired reaction between the ingredients of the coating to render the said coating infusible, the said fluid composition being so chosen as to have the capability of being hardened to infusibility at a temperature less than that at which the wood treated was dried, under atmospheric pressure, substantially as described.

3. A process for coating wood consisting in drying the wood for several hours at a temperature not lower than 220° F., but not high enough to injure the wood, then coating the wood while hot with a fluid composition containing ingredients adapted upon heat treatment to react to form an infusible hard phenolic condensation product, which composition is maintained at a temperature less than that of the wood, and then immediately baking the coated article at a temperature less than that at which the wood was dried, sufficiently to cause the desired reaction between the ingredients of the coating to render the said coating hard and infusible, substantially as described.

4. A process for coating fibrous or porous substances with a phenolic condensation product, consisting in heating the substance for several hours at a temperature higher than the reaction temperature of the said product, then coating the substance while hot with a fluid composition having a temperature less than that of the substance treated, comprising a phenol resin, a methylene-containing hardening agent therefor, and a substance adapted to render the mass fluid at a relatively low temperature, and to constitute a desirable ingredient of the final product, and then immediately baking the coated article at atmospheric pressure and at a temperature less than that at which the substance was dried, but at a sufficient temperature and for a sufficient time to cause the desired reaction between the reacting ingredients of the coating to render the same hard and infusible, substantially as described.

This specification signed and witnessed this 8th day of April, 1912.

JONAS W. AYLSWORTH.

Witnesses:
DYER SMITH,
HENRY SHELDON.